US012565559B2

(12) United States Patent
Liu et al.

(10) Patent No.: US 12,565,559 B2
(45) Date of Patent: Mar. 3, 2026

(54) WATER-DISPERSIBLE MODIFIED POLYISOCYANATES

(71) Applicant: Covestro Deutschland AG, Leverkusen (DE)

(72) Inventors: Hao Liu, Shanghai (CN); Yaguang Ma, Shanghai (CN); Na Xu, Shanghai (CN); Tian Xia, Shanghai (CN); Karsten Danielmeier, Solingen (DE); Raul Pires, Cologne (DE); Hans-Josef Laas, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 225 days.

(21) Appl. No.: 18/044,632

(22) PCT Filed: Sep. 29, 2021

(86) PCT No.: PCT/EP2021/076829

§ 371 (c)(1),
(2) Date: Mar. 9, 2023

(87) PCT Pub. No.: WO2022/069563

PCT Pub. Date: Apr. 7, 2022

(65) Prior Publication Data

US 2024/0010783 A1 Jan. 11, 2024

(30) Foreign Application Priority Data

Sep. 30, 2020 (CN) ......................... 202011069926.8
Dec. 17, 2020 (EP) .................................... 20215016

(51) Int. Cl.
*C08G 18/78* (2006.01)
*C08G 18/70* (2006.01)
*C09D 175/04* (2006.01)

(52) U.S. Cl.
CPC ....... *C08G 18/706* (2013.01); *C08G 18/7843* (2013.01); *C08G 18/7875* (2013.01); *C08G 18/7887* (2013.01); *C08G 18/7893* (2013.01); *C09D 175/04* (2013.01); *C08G 2150/00* (2013.01); *C08G 2170/00* (2013.01); *C08G 2190/00* (2013.01)

(58) Field of Classification Search
CPC ................ C08G 18/7843; C08G 78/75; C08G 78/7893; C08G 78/7887
See application file for complete search history.

(56) References Cited

U.S. PATENT DOCUMENTS

| | | | |
|---|---|---|---|
| 4,265,798 A | 5/1981 | Mishra | |
| 4,379,905 A | 4/1983 | Stemmler et al. | |
| 4,487,928 A | 12/1984 | Richter et al. | |
| 4,604,418 A | 8/1986 | Shindo et al. | |
| 4,960,848 A | 10/1990 | Scholl et al. | |
| 5,076,958 A | 12/1991 | Pedain et al. | |
| 5,098,983 A | 3/1992 | Bosbach et al. | |
| 5,334,637 A | 8/1994 | Zwiener et al. | |
| 5,473,011 A | 12/1995 | Laas et al. | |
| 5,914,383 A | 6/1999 | Richter et al. | |
| 6,426,414 B1 | 7/2002 | Laas et al. | |
| 6,767,958 B2 | 7/2004 | Laas et al. | |
| 9,926,402 B2 | 3/2018 | Laas et al. | |
| 9,975,985 B2 | 5/2018 | Ji et al. | |
| 2004/0019160 A1* | 1/2004 | Dai | C08G 18/0823 525/457 |
| 2008/0300338 A1 | 12/2008 | Wagner et al. | |
| 2010/0183883 A1 | 7/2010 | Schaefer et al. | |
| 2019/0330408 A1* | 10/2019 | Laas | C08G 18/807 |

FOREIGN PATENT DOCUMENTS

| | | |
|---|---|---|
| DE | 3240613 A1 | 5/1984 |
| EP | 0100129 A1 | 2/1984 |
| GB | 809809 A | 3/1959 |
| GB | 1386399 A | 3/1975 |
| GB | 1391066 A | 4/1975 |
| GB | 2221465 A | 2/1990 |
| GB | 2222161 A | 2/1990 |
| WO | 2020109189 A1 | 6/2020 |

OTHER PUBLICATIONS

Laas et al., J. Prakt. Chem. 336 (1994) pp. 185-200.
Rompp's Chemical Dictionary (Rompp Chemie Lexikon), 10th edition, Georg Thieme Verlag Stuttgart, 1996.
Meerwein et al., Angew. Chem. 1960, 72, pp. 927-934.
Cinnamon, S., et al., European Polymer Journal, Jun. 14, 1979, pp. 147-148.
International Search Report, PCT/EP2021/076829, date of mailing: Dec. 14, 2021, Authorized officer: Cristina Stefaniu.

* cited by examiner

*Primary Examiner* — Michael L Leonard
(74) *Attorney, Agent, or Firm* — The Webb Law Firm

(57) ABSTRACT

The invention relates to a water-dispersible modified polyisocyanate and use thereof, especially as a crosslinking component in water-soluble or water-dispersible coating compositions. The water-dispersible modified polyisocyanate can be obtained by the reaction of a system comprising a water-dispersible polyisocyanate and an isocyanate-reactive component; wherein the viscosity of the water-dispersible modified polyisocyanate is 3000 mPa·s-11000 mPa·s, which is measured with a MV-DIN rotor according to DIN EN ISO 3219:1994-10 at 23° C. and a shear rate of 10 $s^{-1}$. The modified polyisocyanate according to the present invention has good manual stirring behavior and good dispersibility, and the coating formed by the coating composition containing the modified polyisocyanate has high gloss and good transparency.

16 Claims, No Drawings

WATER-DISPERSIBLE MODIFIED POLYISOCYANATES

CROSS-REFERENCE TO RELATED APPLICATIONS

This application is a national stage application under 35 U.S.C. § 371 of PCT/EP2021/076829, filed Sep. 29, 2021, which claims the benefit of Chinese Patent Application No. 202011069926.8, filed Sep. 30, 2020 and European Application No. 20215016.5, filed Dec. 17, 2020, each of which is incorporated herein by reference.

TECHNICAL FIELD

The invention relates to a water-dispersible modified polyisocyanate and the uses thereof, especially as a crosslinking component in water-soluble or water-dispersible coating compositions.

BACKGROUND

Due to the increasingly stringent environmental regulations in various countries, water-dispersible modified polyisocyanates have become more and more important in various applications in recent years. Water-dispersible modified polyisocyanates are often used as a crosslinking component in aqueous two-component coating compositions or aqueous adhesives and sealants. Water-dispersible modified polyisocyanates are used to crosslink aqueous dispersions in textile finishing or formaldehyde-free textile printing inks. In addition, they may also be used as an additive for paper wet strengthening treatment (see, for example, EP-A 0959087 and the references cited therein).

At present, water-dispersible modified polyisocyanates are roughly divided into two types: non-ionically modified polyisocyanates and ionically modified polyisocyanates. Non-ionically modified, water-dispersible polyisocyanates, especially polyether modified, water-dispersible polyisocyanates are widely used, but they still have many disadvantages. For example, due to the very high viscosity to be overcome during the dispersion, a considerable shear force (such as by high-speed stirring) must be applied to make it evenly dispersed in water. Further, for example, when such a polyether-modified, water-dispersible polyisocyanate is used as a crosslinking agent in an aqueous two-component coating composition, a larger amount of polyether is generally introduced during the synthesis of the polyisocyanate in order to achieve better dispersibility of polyisocyanate in the coating composition, which on one hand reduces the water resistance of the formed coating, and on the other hand, significantly reduces the concentration of the isocyanate groups in the polyether-modified water-dispersible polyisocyanate and reduces the crosslinking density thereof.

In order to overcome the above shortcomings, attempts have been made to use ionically modified water-dispersible polyisocyanates.

For example, a water-dispersible polyisocyanate modified with carboxylic acid groups is obtained by using a carboxylic acid group-modified polyisocyanate (EP-A 0443138, EP-A 0510438 and EP-A 0548669). The carboxylic acid group-modified polyisocyanate can be dispersed in water by stirring without high shear force. However, its storage stability is poor, especially after the carboxylic acid groups are neutralized. Moreover, since the carboxylate groups of the carboxylic acid group-modified polyisocyanate have a certain catalytic activity, the isocyanate groups in the carboxylic acid group-modified polyisocyanate start to polymerize at room temperature, for example, to trimerize into a polyisocyanurate or to form α-polyamide structure, which leads to the gelation and poor storage stability of the carboxylic acid group-modified polyisocyanate.

Another example is a water-dispersible polyisocyanate modified with sulfonic acid groups which is obtained from a sulfonic acid group-modified polyisocyanate. CN 101754990 A discloses a method for modifying polyisocyanates with 4-aminotoluene-2-sulfonic acid containing a benzene ring, and the water dispersibility of the resulting sulfonic acid group-modified polyisocyanate is better than that of the carboxylic acid group-modified polyisocyanate. However, the presence of the benzene ring therein reduces the yellowing resistance of the formed coating. CN 1190450 C discloses the use of 3-cyclohexylaminopropanesulfonic acid and 2-(cyclohexylamino)-ethanesulfonic acid as a hydrophilizing modifier and the use of tertiary amines as a phase transfer catalyst and a neutralizer to prepare a modified polyisocyanate. CN 104448232 discloses the use of 4-(cyclohexylamino)-butanesulfonic acid as a hydrophilizing modifier and the use of tertiary amine as a phase transfer catalyst to prepare a modified polyisocyanate. The above sulfonic acid group-modified polyisocyanates can be dispersed in water without high shearing force. However, in actual operation, it still needs for the operators to dilute the sulfonic acid group-modified polyisocyanate with a solvent to a concentration of 70-80% to reduce its viscosity, and then mix with other coating components, and stir by hand for dispersing to obtain the coating. The addition of the solvent will significantly increase the VOC content of the coating composition, which is harmful to the environment and humans.

Therefore, there is a demand in the industry for a water-dispersible modified polyisocyanate that has good dispersibility and manual stirring behavior without being diluted with a solvent.

SUMMARY OF THE INVENTION

The object of the present invention is to provide a water-dispersible modified polyisocyanate and a method for preparing the same and use thereof, especially as a crosslinking component in water-soluble or water-dispersible coating compositions, adhesives or sealants.

The water-dispersible modified polyisocyanate according to the present invention can be obtained by the reaction of a system comprising a. a water-dispersible polyisocyanate; and b. an isocyanate-reactive component;

wherein the water-dispersible modified polyisocyanate comprising the structures of formula I, II and III:

I

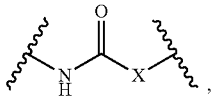,

II

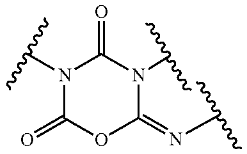,

-continued

III

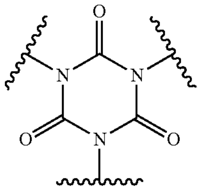

, wherein X is selected from O, S, $NR^9$ and $CR^{10}R^{11}$, wherein $R^9$, $R^{10}$ and $R^{11}$ may be identical or different and represent hydrogen or organic groups inert to isocyanate groups, preferably hydrogen; and the ratio of moles of the carbon atoms in the structure of formula I to the sum of moles of the structures of formula II and III calculated according to carbon NMR spectrum is 0.005-0.24, wherein the term "moles of the carbon atoms in the structure of formula I" refers to the moles of carbon atoms in carbonyl group in formula I; and the viscosity of the water-dispersible modified polyisocyanate is 3000 mPa·s to 11000 mPa·s, which is measured with a MV-DIN rotor in accordance with DIN EN ISO 3219: 1994-10 at 23° C. and at a shear rate of 10 $s^{-1}$.

The ratio of moles of the carbon atoms in the structure of formula I to the sum of moles of the structures of formula II and III is calculated according to carbon NMR spectrum; Calculation of p: $p=I_c/(II_c/3+III_c/3)$, wherein Ic is the integrated area of the peaks of the carbon atoms in the formula I in the carbon NMR spectrum, IIc is the integrated area of the peaks of the three carbon atoms in the ring represented by the formula II in the carbon NMR spectrum, and IIIc is the integrated area of the peaks of the three carbon atoms in the ring represented by the formula III in the carbon NMR spectrum.

According to one aspect of the present invention, there is provided a method for preparing the water-dispersible modified polyisocyanate according to the present invention, including a step of mixing the component a) water-dispersible polyisocyanate or a component for preparing the water-dispersible polyisocyanate with the component b) isocyanate-reactive component in any manner.

According to another aspect of the present invention, there is provided the use of the water-dispersible modified polyisocyanate according to the present invention as a starting component for preparing polyurethanes.

According to another aspect of the present invention, there is provided the use of the water-dispersible modified polyisocyanate according to the present invention as a crosslinking component in water-soluble or water-dispersible coating compositions, adhesives or sealants.

According to another aspect of the present invention, there is provided the use of the water-dispersible modified polyisocyanate according to the present invention as a starting component for preparing polyisocyanates blocked by a blocking agent.

According to another aspect of the present invention, there is provided a coating composition, an adhesive or a sealant comprising the water-dispersible modified polyisocyanate according to the present invention.

According to another aspect of the present invention, there is provided a substrate coated with the coating composition, the adhesive or the sealant according to the present invention.

According to another aspect of the present invention, there is provided the use of the water-dispersible modified polyisocyanate according to the present invention for improving the manual stirring behavior of coating compositions, adhesives or sealants.

According to another aspect of the present invention, there is provided the use of the water-dispersible modified polyisocyanate according to the present invention as a crosslinking component in water-soluble or water-dispersible aqueous two-component coating compositions.

According to another aspect of the present invention, there is provided an aqueous two-component coating composition comprising at least an aqueous hydroxy resin dispersion, at least a water-dispersible modified polyisocyanate according to the present invention, optionally an auxiliary agent and optionally an additive.

According to another aspect of the present invention, there is provided a method for preparing an aqueous two-component coating composition including steps of mixing an aqueous hydroxy resin dispersion, optionally an additive and optionally an additive in any manner to obtain a mixture, and mixing and manually stirring the water-dispersible modified polyisocyanate according to the present invention with the mixture to obtain the aqueous two-component coating composition.

According to another aspect of the present invention, provided is a product comprising a substrate and a coating formed by applying the aqueous two-component coating composition of the present invention to the substrate.

According to another aspect of the present invention, there is provided a method for manufacturing a product including applying the aqueous two-component coating composition of the present invention to a substrate, and then curing and drying.

The water-dispersible modified polyisocyanate of the present invention is obtained by the reaction of a water-dispersible polyisocyanate and an isocyanate-reactive component. No additional hydrophilizing agent is added to the reaction. The resulting water-dispersible modified polyisocyanate itself has good manual stirring behavior, and can be directly mixed with other coating components without diluting with a solvent, and uniformly dispersed in the resin by simply stirring by hand to obtain the coating composition, and the coating formed by the coating composition has good gloss and transparency.

No solvent is necessary to disperse the water-dispersible modified polyisocyanate of the present invention. Therefore, the resulting coating composition, adhesive or sealant comprising the water-dispersible modified polyisocyanate of the present invention has low VOC content.

Therefore, the present invention actually provides a water-dispersible modified polyisocyanate with good manual stirring behavior and good dispersibility, and the coating formed by the coating composition containing the modified polyisocyanate has high gloss and good transparency.

EMBODIMENTS

A water-dispersible modified polyisocyanate is obtainable by the reaction of a system comprising a. a water-dispersible polyisocyanate; and b. an isocyanate-reactive component;

wherein the water-dispersible modified polyisocyanate comprising the structures of formula I, II and III:

I

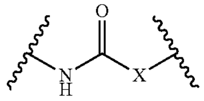,

II

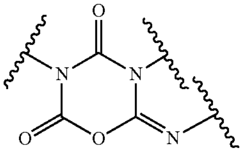,

III

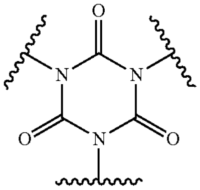, wherein X is selected from O, S, $NR^9$ and $CR^{10}R^{11}CR_2$; wherein, $R^9$, $R^{10}$ and $R^{11}$ may be identical or different and represent hydrogen or organic groups inert to isocyanate groups, preferably hydrogen; and the ratio of moles of the carbon atoms in the structure of formula I to the sum of moles of the structures of formula II and III calculated according to carbon NMR spectrum is 0.005-0.24, wherein the term "moles of the carbon atoms in the structure of formula I" refers to the moles of carbon atoms in carbonyl group in formula I; and the viscosity of the water-dispersible modified polyisocyanate is 3000 mPa·s-11000 mPa·s, which is measured with a MV-DIN rotor in accordance with DIN EN ISO 3219: 1994-10 at 23° C. and at a shear rate of 10 $s^{-1}$. The invention also provides a method for preparing a water-dispersible modified polyisocyanate, and its use for preparing polyurethanes or polyisocyanates blocked by a blocking agent, use for preparing water-soluble or water-dispersible coating compositions, adhesives or sealants, and use for improving manual stirring behavior of the coating compositions, adhesives or sealants, a coating composition, an adhesive or a sealant comprising the water-dispersible modified polyisocyanate, especially use of the water-dispersible modified polyisocyanate in the wood coating, a method for preparing an aqueous two-component coating composition, and a product obtained by applying the coating composition to a substrate, and a method for manufacturing the product.

The number average molecular weight of the polyisocyanates of the present invention is measured according to DIN 55672-1: 2016-03 by gel permeation chromatography with polystyrene as the standard and tetrahydrofuran as the eluent.

The isocyanate group in the present invention refers to a NCO group with a molecular weight of 42 g/mol.

The sulfonate group in the present invention refers to a $SO_3^{2-}$ group with a molecular weight of 80 g/mol.

The ethylene oxide unit in the present invention refers to a $C_2H_4O$ group with a molecular weight of 44 g/mol.

Molecular weight distribution in the present invention refers to the ratio of the weight average molecular weight to the number average molecular weight.

The viscosity of the polyisocyanates of the present invention is measured with a MV-DIN rotor according to DIN EN ISO 3219: 1994-10 at 23° C. and at a shear rate of 10 $s^{-1}$.

The term "polyurethane" used herein refers to polyurethane urea and/or polyurethane polyurea and/or polyurea and/or polythiourethane.

The term "curing" used herein refers to a process from a liquid state to a cured state of a liquid composition.

The term "coating composition" used herein refers to a composition that can be applied to the surface of an object by a variety of processes to form a continuous solid coating with firm adhesion and certain strength.

The term "adhesive" used herein refers to a chemical substance that can be applied to the surface of an object by a variety of processes, form a coating on the object itself or surfaces of one object and another object and bond the object itself or the surfaces of one object and another object, which is also used as a synonym for tackifier and/or sealant and/or adhesion agent.

The term "isocyanate-reactive component" used herein refers to a component containing a group reactive toward isocyanate groups, that is, a group containing Zerevitinoff-active hydrogen. The definition of Zerevitinoff-active hydrogen refers to Rompp's Chemical Dictionary (Rommp Chemie Lexikon), 10th edition, Georg Thieme Verlag Stuttgart, 1996. In general, the group containing Zerevitinoff-active hydrogen is understood in the art to mean hydroxyl group (OH), amino group (NHO and thiol group (SH).

The term "moles of the carbon atoms in the structure of formula I" used herein refers to the moles of carbon atoms in carbonyl group in formula I.

Component a) a Water-Dispersible Polyisocyanate

The water-dispersible polyisocyanate of the present invention may also refer to a mixture of water-dispersible polyisocyanates.

Preferably, the water-dispersible polyisocyanate has at least one of the following characteristics:

A. average isocyanate functionality of at least 1.8;
B. number average molecular weight of 700 g/mol-1000 g/mol;
C. molecular weight distribution of 1.1-1.6;
D. viscosity of 500 mPa·s-6000 mPa·s;
E. isocyanate group content of 4.0% by weight to 26% by weight, relative to the total weight of the water-dispersible polyisocyanate; and
F. sulfonate group content of 0.1% by weight to 7.7% by weight, relative to the total weight of the water-dispersible polyisocyanate.

The average isocyanate functionality of the water-dispersible polyisocyanate is most preferably of 2-4.

The molecular weight distribution of the water-dispersible polyisocyanate is most preferably in a range of 1.1-1.3.

The isocyanate group content of the water-dispersible polyisocyanate is most preferably 20% by weight to 22% by weight, relative to the total weight of the water-dispersible polyisocyanate.

The sulfonate group content of the water-dispersible polyisocyanate is 0.5% by weight to 1.5% by weight, relative to the total weight of the water-dispersible polyisocyanate.

The sulfonate group content of the water-dispersible polyisocyanate is calculated as (n*80/m)*100/q, wherein m is the molecular weight of aminosulfonic acid, n is the weight of aminosulfonic acid, q is the weight of the water-dispersible polyisocyanate, and 80 is the molecular weight of the sulfonate group.

The water-dispersible polyisocyanate is preferably obtained by a reaction of a starting polyisocyanate, aminosulfonic acid and an organic amine The amount of the water-dispersible polyisocyanate is preferably 97% by weight to 99.96% by weight, relative to the total weight of the system for preparing the water-dispersible modified polyisocyanate.

Starting Polyisocyanate

The starting polyisocyanate is preferably one or more of polyisocyanates having aliphatically, alicyclically, aromatically and araliphatically bonded isocyanate groups. Such a polyisocyanate is a low monomer polyisocyanate with one or more of the following structures: isocyanate dimer structure, isocyanurate structure, allophanate structure, biuret structure, iminooxadiazinedione structure and oxadiazinetrione structure, which can be obtained by modification of the corresponding diisocyanates, for example, as described in J. Prakt. Chem. 336 (1994) 185-200.

The starting polyisocyanate is further preferably one or more of polyisocyanates with aliphatically bonded isocyanate groups and polyisocyanates with alicyclically bonded isocyanate groups, and most preferably one or more of polyisocyanate s with an isocyanurate structure based on hexamethylene diisocyanate, polyisocyanates with an isocyanurate structure based on pentamethylene diisocyanate, polyisocyanates with an isocyanurate structure based on isophorone diisocyanate, and polyisocyanates with an isocyanurate structure based on 4,4'-diisocyanatodicyclohexylmethane.

To prepare the starting polyisocyanate, for example, any desired monomeric diisocyanates and triisocyanates which can be obtained by phosgenation or by phosgene-free processes, for example by thermal cleavage of urethanes, are used. Preferable diisocyanates are those containing aliphatically, alicyclically, araliphatically and/or aromatically bonded isocyanate groups with a molecular weight of 140-400, and most preferably one or more of 1,4-diisocyanatobutane, 1,5-diisocyanatopentane (PDI), 1,6-diisocyanatohexane (HDI), 2-methyl-1,5-diisocyanatoheptane, 1,5-diisocyanato-2,2-dimethylheptane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)cyclohexane, 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis(isocyanatomethyl)-norbornane, tetramethylxylylene diisocyanate (TMXDI), 2,4- and 2,6-diisocyanatotoluene, 2,4'-diisocyanatodiphenylmethane, pentamethylene diisocyanate, 4,4'-diisocyanatodiphenylmethane and 1,5-diisocyanatonaphthalene.

The average isocyanate functionality of the starting polyisocyanate is preferably 2.0-5.0, and most preferably 2.3-4.5.

The isocyanate group content of the starting polyisocyanate is preferably 8.0% by weight to 27.0% by weight, and most preferably 14.0% by weight to 24.0% by weight, relative to the total weight of the starting polyisocyanate.

The monomeric diisocyanate content of the starting polyisocyanate is preferably less than 1% by weight, and most preferably less than 0.5% by weight, relative to the total weight of the starting polyisocyanate.

Aminosulfonic Acid

Preferably, the aminosulfonic acid is of formula V:

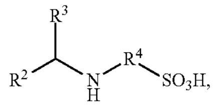

V wherein, $R^2$ and $R^3$ are each independently hydrogen, a substituted or unsubstituted and/or heteroatom-containing aliphatic group with 1-18 carbon atoms, a substituted or unsubstituted and/or heteroatom-containing alicyclic group with 3-18 carbon atoms, a substituted or unsubstituted and/or heteroatom-containing aromatic groups with 1-18 carbon atoms; or $R^2$ reacts with $R^3$ to form an alicyclic group with 3-8 carbon atoms, or a heterocyclic group substituted by an oxygen atom or a nitrogen atom with 3-8 carbon atoms; $R^3$ is a linear or branched aliphatic group with 2-8 carbon atoms.

Preferably, $R^2$ reacts with $R^3$ to form an alicyclic group with 3-8 carbon atoms or a heterocyclic group substituted by an oxygen atom or a nitrogen atom with 3-8 carbon atoms, and the heterocyclic group is preferably further substituted.

$R^4$ is preferably a linear or branched aliphatic group with 2-4 carbon atoms, more preferably a linear or branched aliphatic group with 2-3 carbon atoms, and most preferably a linear or branched aliphatic group with 3 carbon atoms.

The aminosulfonic acid may be a aminosulfonic acid or any mixture of several aminosulfonic acids of formula V.

The aminosulfonic acid is preferably one or more of 3-cyclohexylaminopropane-1-sulfonic acid, 4-cyclohexylamino-1-butanesulfonic acid and 2-cyclohexylaminoethane-1-sulfonic acid, more preferably one or more of 3-cyclohexylaminopropane-1-sulfonic acid and 4-cyclohexylamino-1-butanesulfonic acid, and most preferably 3-cyclohexylaminopropane-1-sulfonic acid.

The amount of the aminosulfonic acid is preferably 0.28% by weight to 22% by weight, more preferably 1.5% by weight to 3.5% by weight, still preferably 2% by weight to 3% by weight, and most preferably 2.2% by weight to 2.9% by weight, relative to the total weight of the starting polyisocyanate and aminosulfonic acid.

The amount of sulfonate group in the aminosulfonic acid is preferably of 0.1% by weight to 7% by weight, relative to the total weight of the aminosulfonic acid.

Organic Amine

The organic amine of the present invention is used to neutralize the sulfonic acid group of the aminosulfonic acid.

The organic amine is preferably tertiary amine

The tertiary amine is preferably one or more of tertiary monoamine, tertiary diamine, and other tertiary amines containing groups reactive toward isocyanate.

The tertiary monoamine is preferably one or more of trimethylamine, triethylamine, tripropylamine, tributylamine, dimethylcyclohexylamine, N-methylmorpholine, N-ethylmorpholine, N-methylpiperidine, N-ethylpiperidine and N,N-dimethylcyclohexylamine.

The tertiary diamine is preferably one or more of 1,3-bis-(dimethylamino)-propane, 1,4-bis-(dimethylamino)-butane and N,N'-dimethyl piperazine.

The tertiary amine is most preferably N,N-dimethylcyclohexylamine.

Other tertiary amines containing groups reactive toward isocyanate are preferably neutralizing amines, which are preferably alkanolamines, such as dimethylethanolamine, methyldiethanolamine and/or triethanolamine.

The molar equivalent ratio of the organic amine to the sulfonate group of the aminosulfonic acid is preferably of 0.3-1.9, and most preferably 0.6-1.4.

The amount of the tertiary amine is sufficient to catalyze the reaction of the starting polyisocyanate and the aminosulfonic acid, while other conventional catalysts known in polyurethane chemistry are optionally used to accelerate the reaction for preparing the water-dispersible polyisocyanate. The conventional catalyst is preferably one or more of other tertiary amines and a metal salts.

Other tertiary amine is preferably one or more of triethylamine, pyridine, picoline, benzyldimethylamine, N,N-endoethylenepiperazine, N-methylpiperidine, pentamethyldiethylenetriamine, N,N-dimethyl-aminocyclohexane and N,N'-dimethylpiperazine.

The metal salt is preferably one or more of ferric chloride, aluminum tris(ethyl acetoacetate), zinc chloride, zinc n-octanoate, zinc 2-ethyl-1-hexanoate, zinc 2-ethylhexanoate, zinc stearate, zinc naphthenate, zinc acetylacetonate, tin n-octoate, tin 2-ethyl-1-hexanoate, tin ethylhexanoate, tin laurate, tin palmitate, dibutyl tin oxide, dibutyl tin dichloride, dibutyl tin diacetate, dibutyl tin bimaleate, dibutyl tin dilaurate, dioctyl tin diacetate and molybdenum glycolate.

The amount of the conventional catalyst is preferably of 0.001% by weight to 2.0% by weight, and most preferably 0.005% by weight to 0.5% by weight, relative to the total weight of the raw materials for preparing the water-dispersible polyisocyanate.

Component b) Isocyanate-Reactive Component

The amount of the isocyanate-reactive component is preferably 0.04% by weight to 3% by weight, and most preferably 0.04% by weight to 2.35% by weight, relative to the total weight of the system.

The isocyanate-reactive component is preferably one or more of water and compounds having the structure of formula IV:

$$(H_a—Y)_b—R^1, \qquad \text{IV}$$

wherein Y is selected from O, N, S and O—CO, and a is an integer greater than or equal to 1, b is an integer greater than or equal to 1, and $R^1$ is an organic group that is inert to isocyanate groups. b is more preferably greater than or equal to 2, more preferably 2-6, and most preferably 2-4.

Y is most preferably an oxygen atom. When Y in the compound having the structure of formula IV is an oxygen atom, a is 1, b is ≥2, preferably 2-6, and most preferably 2-4.

When b is ≥2, Y is selected from O, N, S and O—CO, and Y can be the same or different.

The compound having the structure of formula IV is preferably one or more of polyacids with a molecular weight of 90 g/mol-1000 g/mol, polyamines with a molecular weight of 40 g/mol-1000 g/mol, polythiols with a molecular weight of 40 g/mol-1000 g/mol, low-molecular-weight hydroxy alcohols with a molecular weight of 40 g/mol-1000 g/mol and polyhydroxy polymer with a molecular weight of 200 g/mol-5000 g/mol, more preferably a low-molecular-weight hydroxy alcohol with a molecular weight of 62 g/mol-1000 g/mol; and ethylene glycol is most preferred.

The carboxyl functionality of the polyacid with a molecular weight of 90 g/mol-1000 g/mol is preferably 2-4.

The polyacid with a molecular weight of 90 g/mol-1000 g/mol is most preferably one or more of oxalic acid, malonic acid, succinic acid, glutaric acid, adipic acid, pimelic acid, suberic acid, azelaic acid, 1,10-sebacic acid, isomeric glutaric acids, 1,2-cyclohexanedicarboxylic acid, 1,4-cyclohexanedicarboxylic acid, 1,4-cyclohexylcyclohexanoic acid, 4,4'-(1-methylethylene)dicyclohexanoic acid and 1,2,6-hex anetricarboxylic acid.

The polyamine with a molecular weight of 40 g/mol-1000 g/mol is preferably a polyamine with a molecular weight of 40 g/mol-500 g/mol; most preferably one or more of aliphatic polybasic primary amines, aromatic polybasic primary amines, aliphatic secondary amines, aromatic secondary amines, polyether amines and polyamines of formula VI.

The aliphatic polybasic primary amine, aromatic polybasic primary amine, aliphatic secondary amine and aromatic secondary amine are preferably one or more of ethylenediamine, propylenediamine, butanediamine, pentanediamine, hexamethylenediamine, heptane diamine, octane diamine, nonane diamine, 1,10-decane diamine, ethylenediamine, 1,2-diaminopropane, 1,4-diaminobutane, 1,3-diaminopentane, 1,6-diaminohexane, 2,5-diamino-2,5-dimethylhexane, 2,2,4-trimethyl-1,6-diaminohexane, 2,4,4-trimethyl-1,6-diaminohexane, 1,11-diaminoundecane, 1,12-diaminododecane, 1,3-cyclohexanediamine, 1,4-cyclohexanediamine, 1-amino-3,3,5-trimethyl-5-aminomethyl-cyclohexane, 2,4-hexahydrotoluenediamine, 2,6-hexahydrotoluenediamine, 2,4'-diaminodicyclohexylmethane, 4,4'-diaminodicyclohexylmethane, 3,3'-dialkyl-4,4'-diamino-dicyclohexylmethane, 2,4-diaminotoluene, 2,6-diaminotoluene, 2,4'-diaminodiphenylmethane and 4,4'-diaminodiphenylmethane; and most preferably one or more of 1,4-diaminobutane, 1,6-diaminohexane, 2,2,4-trimethyl-1,6-diaminohexane, 2,4,4-trimethyl-1,6-diaminohexane, 1,3-cyclohexanediamine, 1,4-cyclohexanediamine, 1-amino-3,3,5-trimethyl-5-aminomethylcyclohexane, 2,4-hexahydrotoluenediamine, 2,6-hexahydrotoluenediamine, 4,4'-diamino-dicyclohexylmethane, 3,3'-dimethyl-4,4'-diaminodicyclohexylmethane and 3,3'-diethyl-4,4'-diamino-dicyclohexylmethane.

The polyether amine is preferably those with a molecular weight of 100 g/mol-4000 g/mol and an amino functionality of 2-4, and most preferably the product sold under the trademark Jeffamine by Texaco.

The polyamine of formula VI:

VI

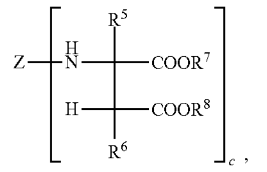

wherein,

Z represents an organic group having a valence of c and being inert to isocyanate groups at 100° C. or lower, preferably a divalent hydrocarbon group obtained by removing amino groups from aliphatic, araliphatic or alicyclic polyamines, and most preferably diamine;

$R^5$ and $R^6$ may be identical or different, and each independently is preferably hydrogen or an organic group that is inert to isocyanate groups at 100° C. or lower, and most preferable hydrogen;

$R^7$ and $R^8$ may be identical or different, and each independently is preferably an organic group that is inert to isocyanate groups at 100° C. or lower, and most preferably one or more of methyl and ethyl; c represents an integer not less than 2, preferably an integer of 2 to 4, and most preferably 2.

The polyamine of formula VI is preferably obtained by derivatization from one or more of low-molecular-weight aliphatic polybasic primary amines, low-molecular-weight aromatic polybasic primary amines, low-molecular-weight aliphatic secondary amines, low-molecular-weight aromatic secondary amines and polybasic primary amines in polyether amines; most preferably obtained by the reaction of one or more of low-molecular-weight aliphatic polybasic primary amines, low-molecular-weight aromatic polybasic primary amines, low-molecular-weight aliphatic secondary amines, low-molecular-weight aromatic secondary amines and polybasic primary amines in polyether amines with maleate or fumarate of formula VII,

VII

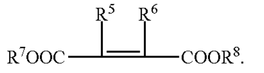

The maleate or fumarate of formula VII is preferably one or more of dimethyl maleate, diethyl maleate, dibutyl maleate, dimethyl fumarate, diethyl fumarate and dibutyl fumarate.

The polythiol with a molecular weight of 40 g/mol-1000 g/mol is preferably one or more of ethanedithiol, propanedithiol, butanedithiol, pentanedithiol, hexanedithiol, heptanedithiol, octanedithiol, nonanedithiol, 1,10-decanedithiol, isomeric pentanedithiols, 1,2-cyclohexanedithiol, 1,4-cyclohexanedithiol, 1,4-cyclohexylcyclohexylthiol, 4,4'-(1-methylethylene)dicyclohexanethiol and 1,2,6-hexanetrithiol.

The low-molecular-weight hydroxy alcohol with a molecular weight of 40 g/mol-1000 g/mol is preferably one or more of ethylene glycol, propylene glycol, butylene glycol, pentanediol, hexanediol, heptanediol, octanediol, nonanediol, 1,10-decanediol, isomeric pentanediols, 1,2-cyclohexanediol, 1,4-cyclohexanediol, 1,4-cyclohexylcyclohexanol, 4,4'-(1-methylethylene)dicyclohexanol, 1,1,1-trimethylolethane, 1,2,6-hexanetriol, 1,1,1-trimethylolpropane, 2,2-bis(hydroxymethyl)-1,3-propanediol, 1,2,4-trihydroxycyclohexane, 1,3,5-trihydroxycyclohexane, 1,3,5-tris(2-hydroxyethyl) isocyanurate and neopentyl glycol hydroxypivalate.

The polyhydroxy polymer with a molecular weight of 200 g/mol-5000 g/mol is preferably one or more of polyether polyols, polyester polyols, polycarbonate polyols and polyester carbonate polyols, more preferably those with an average hydroxyl functionality of 2-6, and most preferably those with an average hydroxyl functionality of 2-4.

The molecular weight of the polyether polyols is preferably 200 g/mol-2500 g/mol. The molecular weight of the polyether polyols is calculated from the functionality and hydroxyl number of the polyether polyols.

The hydroxyl value of the polyether polyols is preferably of 22 mg KOH/g-561 mg KOH/g, more preferably 45 mg KOH/g-561 mg KOH/g.

The polyether polyols are preferably prepared in a conventional manner by alkoxylation of a suitable starter molecule. The starter molecule can be any desired polyol, most preferably a simple polyol having 2-14 carbon atoms. The alkylene oxide suitable for the alkoxylation is preferably one or more of ethylene oxide and propylene oxide, which can be used in any order or as a mixture in the alkoxylation.

The polyether polyol is most preferably polyoxytetramethylene glycol, which can be prepared for example by polymerization of tetrahydrofuran as described in Angew. Chem. 1960, 72, 927-934.

The molecular weight of the polyester polyols is preferably 200 g/mol-5000 g/mol, more preferably 200 g/mol-2500 g/mol, and most preferably 200 g/mol-800 g/mol, which is calculated from the functionality and hydroxyl number of the polyester polyols.

The hydroxyl value of the polyester polyols is preferably of 16 mg KOH/g-1400 mg KOH/g, more preferably 40 mg KOH/g-1120 mg KOH/g, and most preferably 100 mg/g KOH-300 mg KOH/g.

The polyester polyols are preferably prepared in a conventional manner by reaction of a polyol with an acid, an acid derivative or a lactone.

The acid or acid derivative for preparing the polyester polyols is preferably aliphatic, alicyclic and/or aromatic, and may be optionally substituted with, for example, halogen atoms, and/or unsaturated.

The molecular weight of the acid or acid derivative is preferably 118 g/mol to 300 g/mol.

The acid or acid derivative is most preferably one or more of succinic acid, adipic acid, sebacic acid, phthalic acid, isophthalic acid, trimellitic acid, phthalic anhydride, tetrahydrophthalic acid, maleic acid, maleic anhydride, dimerized fatty acids, trimerized fatty acids, dimethyl terephthalate and diethylene glycol terephthalate.

The lactone is preferably one or more of β-propiolactone, γ-butyrolactone, γ-valerolactone, valerolactone, ε-caprolactone, 3,5,5-trimethylcaprolactone and 3,3,5-trimethylcaprolactone.

The polycarbonate polyol is preferably a polycarbonate diol with a molecular weight in the range of 132 g/mol-400 g/mol prepared by, for example, the reaction of a diol with a diaryl carbonate, such as diphenyl carbonate or a dialkyl carbonate, such as dimethyl carbonate, or phosgene.

Component b) isocyanate-reactive component is most preferably one or more of water and ethylene glycol.

Component c) Catalyst

The system preferably further comprises a catalyst.

The catalyst is preferably one or more of tertiary amine catalysts, tertiary phosphine catalysts, tertiary hydroxyalkylamine catalysts and metal catalysts, and most preferably one or more of metal catalysts and tertiary amine catalysts.

The tertiary amine catalyst is preferably one or more of triethylamine, tributylamine, N,N-dimethylaniline, N-ethylpiperidine and N,N'-dimethylpiperazine.

The tertiary phosphine catalyst is preferably one or more of triethylphosphine, tributylphosphine and dimethylphenylphosphine.

The tertiary hydroxyalkylamine catalyst is preferably that described in GB 2221465 and/or GB 2222161, and most preferably one or more of triethanolamine, N-methyldiethanolamine, dimethylethanolamine, a mixture of a tertiary bicyclic amine (for example, DBU) and a simple aliphatic alcohol having low molecular weight, N-isopropyldiethanolamine and 1-(2-hydroxyethyl)pyrrolidine.

The metal catalyst may be that described in DE A 3240613, preferably one or more of manganese octoate, iron octoate, cobalt octoate, nickel octoate, copper octoate, zinc octoate, zirconium octoate, cerium octoate, lead octoate, manganese naphthenate, iron naphthenate, cobalt naphthenate, nickel naphthenate, copper naphthenate, zinc naphthenate, zirconium naphthenate, cerium naphthenate, lead naphthenate, and mixtures of the above salts with lithium, sodium, potassium, calcium, or barium acetates. The metal catalyst may also be that described in DE A 3219608, and preferably one or more of sodium salts of linear or branched alkanecarboxylic acid having up to 10 carbon atoms and potassium salts of linear or branched alkanecarboxylic acid having up to 10 carbon atoms, wherein the carboxylic acid is preferably one or more of propionic acid, butyric acid, valeric acid, hexanoic acid, heptanoic acid, caprylic acid, pelargonic acid, capric acid and undecanoic acid. The metal catalyst may also be an alkali metal salt and/or alkaline earth metal salt described in EP A 0100129, and preferably one or more of those salts of aliphatic, alicyclic or aromatic mono- and polycarboxylic acids with 2-20 carbon atoms, such as sodium benzoate or potassium benzoate. The metal catalyst may also be an alkali metal phenolate known from GB 1391066 A and GB 1386399 A, and preferably one or more of sodium phenolate and potassium phenolate. The metal catalyst may also be that known from GB 809809, and preferably one or more of alkali metal oxides, alkaline earth metal oxides, alkali metal hydroxides, alkaline earth metal hydroxides, alkali metal carbonates, alkaline earth metal carbonates, alkali metal alkoxides, alkaline earth metal alkoxides, alkali metal phenolates, alkaline earth metal phenolates, alkali metal salts of olefinatable compounds, metal salts of weak aliphatic carboxylic acids, metal salts of alicyclic carboxylic acids, basic alkali metal compounds complexed with crown ethers and basic alkali metal compounds complexed with polyether alcohols. The metal catalyst may also be a potassium salt of pyrrolidone known from EP A 0033581. The metal catalyst can also be a monocyclic or polycyclic complexes of titanium, zirconium and/or hafnium known from EP A 2883895, and preferably one or more of zirconium tetra-n-butyrate, zirconium tetra-2-ethylhexanoate and zirconium tetra-2-ethylhexanoate. The metal catalyst may also be a tin compound of the type described in European Polymer Journal, Jun. 14, 1979, page 147-148, and preferably one or more of dibutyltin dichloride, diphenyltin dichloride, triphenyltin alkoxide, tributyltin acetate, tributyltin oxide, tin octoate, dibutyl(dimethoxy) stannane and tributyltin imidazolate.

The metal salt of the weak aliphatic carboxylic acid and the metal salt of the alicyclic carboxylic acid are each independently preferably one or more of sodium methoxide, sodium acetate, potassium acetate, sodium acetoacetate, lead 2-ethylhexanoate and lead naphthenate.

The basic alkali metal compound complexed with crown ether and the basic alkali metal compound complexed with polyether alcohol are each independently preferably one or more of complexed sodium or potassium carboxylates, which are known from EP A 0056158 and EP A 0056159.

When the system contains a metal catalyst, a terminator is required after the reaction of the system is finished. The above-mentioned phosphoric acid catalysts, sulfonic acid catalysts and their derivatives can be used here as a terminator. In addition to these two acid catalysts, other inorganic acids such as hydrochloric acid, phosphorous acid, acyl chlorides such as acetyl chloride, benzoyl chloride or isophthaloyl dichloride may also be used as a terminator.

The amount of the catalyst is preferably of 0% by weight to 0.02% by weight, and most preferably 0.001% by weight to 0.02% by weight, relative to the total weight of the system.

Water-Dispersible Modified Polyisocyanate

The viscosity of the water-dispersible modified polyisocyanate of the present invention is preferably 3000 mPa·s-10000 mPa·s, which is measured with a MV-DIN rotor according to DIN EN ISO 3219: 1994-10 at 23° C. and at a shear rate of 10 $s^{-1}$.

Preferably, the water-dispersible modified polyisocyanate has at least one of the following characteristics:

i. average isocyanate functionality of at least 1.5;
ii. number average molecular weight of 700 g/mol-1200 g/mol;
iii. molecular weight distribution of 1.2-2.0;
iv. isocyanate group content of 4.0% by weight to 23% by weight, relative to the total weight of the water-dispersible modified polyisocyanate;
v. sulfonate group content of 0.1% by weight to 7.5% by weight, relative to the total weight of the water-dispersible modified polyisocyanate;
vi. the total amount of molecules with a number average molecular weight greater than 2700 g/mol of 3.0% by weight to 20% by weight, relative to the total weight of the water-dispersible modified polyisocyanate;
vii. the content of the ethylene oxide units bonded into the polyether chain of the modified polyisocyanate of not more than 19.5% by weight, relative to the total weight of the water-dispersible modified polyisocyanate.

Most preferably, the water-dispersible modified polyisocyanate has all the characteristic i to vii.

In the characteristic vii, the polyether chain bonded into the modified polyisocyanate preferably contains a statistical average of 5 to 35 ethylene oxide units.

The number average molecular weight of the water-dispersible modified polyisocyanate is more preferably of 700 g/mol-1000 g/mol, and most preferably 700 g/mol-900 g/mol.

The isocyanate group content is more preferably of 19.0% by weight to 22.0% by weight, and most preferably 20% by weight to 22% by weight, relative to the total weight of the water-dispersible modified polyisocyanate.

The sulfonate group content is most preferably of 0.5% by weight to 1.5% by weight, relative to the total weight of the water-dispersible modified polyisocyanate.

Method for calculating the sulfonate group content of the water-dispersible modified polyisocyanate is as follows:

The sulfonate group content of the water-dispersible modified polyisocyanate=(n*80/m)*100/s, wherein m is the molecular weight of aminosulfonic acid, n is the weight of aminosulfonic acid, s is the weight of the water-dispersible modified polyisocyanate, and 80 is the molecular weight of sulfonate group.

The molecular weight distribution of the water-dispersible modified polyisocyanate is more preferably in a range of 1.2-1.6, and most preferably of 1.2-1.5.

The total amount of molecules with a number average molecular weight greater than 2700 g/mol is more preferably of 3.0% by weight to 14% by weight, and most preferably 3.0% by weight to 11% by weight, relative to the total weight of the water-dispersible modified polyisocyanate.

The ratio of moles of the carbon atoms in the structure of formula I to the sum of moles of the structures of formula II and III of the water-dispersible modified polyisocyanate calculated according to carbon NMR spectrum is 0.005-0.15, and most preferably 0.005-0.10.

The water-dispersible modified polyisocyanate is preferably obtained by the reaction of a system comprising a. a water-dispersible polyisocyanate with the characteristics of
   A. average isocyanate functionality of at least 1.8;
   B. number average molecular weight of 700 g/mol-1000 g/mol;

C. molecular weight distribution of 1.1-1.6;

D. a viscosity of 500 mPa·s-6000 mPa·s;

E. isocyanate group content of 4.0% by weight to 26% by weight, relative to the total weight of the water-dispersible polyisocyanate; and F. sulfonate group content of 0.1% by weight to 7.7% by weight, relative to the total weight of the water-dispersible polyisocyanate; and b. an isocyanate-reactive component, which is one or more of water and a low-molecular-weight hydroxy alcohols with a molecular weight of 40 g/mol-1000 g/mol.

The water-dispersible modified polyisocyanate comprises the structures of formula I, II and III:

I

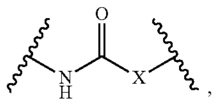

II

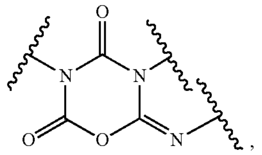

III

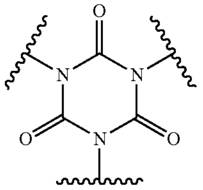

wherein X is selected from O, S, $NR^9$ and $CR^{10}R^{11}$, wherein $R^9$, $R^{10}$ and $R^{11}$ may be identical or different and represent hydrogen or organic groups inert to isocyanate groups, preferably hydrogen; and the ratio of moles of the carbon atoms in the structure of formula I to the sum of moles of the structures of formula II and III calculated according to carbon NMR spectrum is 0.005-0.24, wherein the term "moles of the carbon atoms in the structure of formula I" refers to the moles of carbon atoms in carbonyl group in formula I; and the viscosity of the water-dispersible modified polyisocyanate is 3000 mPa·s to 11000 mPa·s, which is measured with a MV-DIN rotor in accordance with DIN EN ISO 3219: 1994-10 at 23° C. and at a shear rate of 10 $s^{-1}$; and the water-dispersible modified polyisocyanate has at least one of the characteristics of i. average isocyanate functionality of at least 1.5;

ii. number average molecular weight of 700 g/mol-1000 g/mol;

iii. molecular weight distribution of 1.2-2.0;

iv. isocyanate group content of 4.0% by weight to 23% by weight, relative to the total weight of the water-dispersible modified polyisocyanate;

v. sulfonate group content of 0.1% by weight to 7.5% by weight, relative to the total weight of the water-dispersible modified polyisocyanate;

vi. the total amount of molecules with a number average molecular weight greater than 2700 g/mol is of 3.0% by weight to 14% by weight, relative to the total weight of the water-dispersible modified polyisocyanate; and vii. the content of the ethylene oxide units bonded into the polyether chain of the modified polyisocyanate of not more than 19.5% by weight, relative to the total weight of the water-dispersible modified polyisocyanate.

The water-dispersible modified polyisocyanate is most preferably obtained by the reaction of a system comprising a. a water-dispersible polyisocyanate with the characteristics of A. average isocyanate functionality of at least 1.8;

B. number average molecular weight of 700 g/mol-1000 g/mol;

C. molecular weight distribution of 1.1-1.6;

D. a viscosity of 500 mPa·s-6000 mPa·s;

E. isocyanate group content of 4.0% by weight to 26% by weight, relative to the total weight of the water-dispersible polyisocyanate; and F. sulfonate group content of 0.1% by weight to 7.7% by weight, relative to the total weight of the water-dispersible polyisocyanate; and b. an isocyanate-reactive component, which is one or more of water and ethylene glycol.

The amount of the water-dispersible polyisocyanate is 97% by weight to 99.96% by weight, and the amount of the isocyanate-reactive component is 0.04% by weight to 3% by weight, relative to the total weight of the system The water-dispersible modified polyisocyanate contains structures of formula I, formula II and formula III:

I

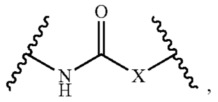

II

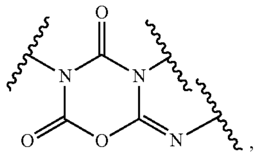

III

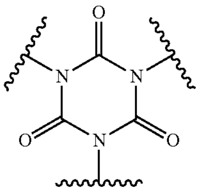

wherein X is selected from O, S, $NR^9$ and $CR^{10}R^{11}$; wherein, $R^9$, $R^{10}$ and $R^{11}$ may be identical or different and represent hydrogen or organic groups inert to isocyanate groups, preferably hydrogen; and the ratio of moles of the carbon atoms in the structure of formula I to the sum of moles of the structures of formula II and III calculated according to carbon NMR spectrum is 0.005-0.24, wherein the term "moles of the carbon atoms in the structure of formula I" refers to the moles of carbon atoms in carbonyl group in formula I; and the viscosity of the water-dispersible modified polyisocyanate is 3000 mPa·s to 11000 mPa·s, which is measured with a MV-DIN rotor in accordance with DIN EN ISO 3219: 1994-10 at 23° C. and at a shear rate of 10 $s^{-1}$;

and the water-dispersible modified polyisocyanate has at least one of the characteristics of i. average isocyanate functionality of at least 1.5;
ii. number average molecular weight of 700 g/mol-1000 g/mol;
iii. molecular weight distribution of 1.2-2.0;
iv. isocyanate group content of 4.0% by weight to 23% by weight, relative to the total weight of the water-dispersible modified polyisocyanate;
v. sulfonate group content of 0.1% by weight to 7.5% by weight, relative to the total weight of the water-dispersible modified polyisocyanate;
vi. the total amount of molecules with a number average molecular weight greater than 2700 g/mol is of 3.0% by weight to 14% by weight, relative to the total weight of the water-dispersible modified polyisocyanate; and
vi. the content of the ethylene oxide units bonded into the polyether chain of the modified polyisocyanate of not more than 19.5% by weight, relative to the total weight of the water-dispersible modified polyisocyanate.

Preparation Method

Method for preparing the water-dispersible modified polyisocyanate preferably includes mixing the component a) water-dispersible polyisocyanate or a component for preparing the water-dispersible polyisocyanate with the component b) isocyanate-reactive component in any manner; wherein the component b) an isocyanate-reactive component is water and/or ethylene glycol.

Use

The water-dispersible modified polyisocyanate is preferably used in a form of an aqueous emulsion.

The water-dispersible modified polyisocyanate of the present invention is preferably used as a crosslinking component for water-soluble or a water-dispersible coating compositions, adhesives or sealants, which has a group reactive toward isocyanate groups, especially an alcoholic hydroxyl group, and is used for producing coatings from such aqueous coating compositions, adhesives or sealants.

When the water-dispersible modified polyisocyanate of the present invention is used as a crosslinking component in water-soluble or water-dispersible coating compositions, the molar ratio of isocyanate groups of the modified polyisocyanate to the groups reactive toward isocyanate groups, particularly alcoholic hydroxyl groups, is preferably 0.5:1 to 2:1.

When the water-dispersible modified polyisocyanate of the invention is used as a crosslinking component in water-soluble or water-dispersible adhesives or sealants, they may be incorporated optionally in a small amount into nonfunctional water-soluble or water-dispersible adhesives or sealants to obtain very specific properties, for example as an additive for improving adhesion, for example as a paper-making aid or an additive without absorbable halides, or for inorganic building materials such as concrete or mortar.

The coating compositions, adhesives or sealants containing the water-dispersible modified polyisocyanate may further comprise an isocyanate other than the water-dispersible modified polyisocyanate. The isocyanate other than the water-dispersible modified polyisocyanate is preferably added to the water-dispersible modified polyisocyanate before it is mixed with the resin component.

The isocyanate other than the water-dispersible modified polyisocyanate is preferably used in an amount that has preferably no influence on the performance of the coating compositions, adhesives, or sealants containing the aqueous hydroxy resin dispersion and the water-dispersible modified polyisocyanate. For this combination, the water-dispersible modified polyisocyanate of the present invention functions as an emulsifier for the isocyanate other than the water-dispersible modified polyisocyanate.

Use for Preparing Polyurethanes

The water-dispersible modified polyisocyanate can be used in the form of those blocked by a blocking agent in an aqueous one-component polyurethane. Suitable blocking agent is, for example, diethyl malonate, ethyl acetoacetate, acetoxime, butanone oxime, ε-caprolactam, 3,5-dimethylpyrazole, 1,2,4-triazole, dimethyl-1,2,4-triazole, imidazole or any mixture of these blocking agents.

The water-dispersible modified polyisocyanate has excellent emulsifiability and dispersibility in water and can be uniformly distributed without the presence of an organic solvent. The coating formed by the polyurethane obtained therefrom has excellent optical properties, especially high surface gloss and high transparency.

Method for Manufacturing a Product

Coating can be carried out by means of mechanical tools known to those skilled in the art or a two-component spray gun.

The substrate can be any substrate, preferably metal, wood, alloy, inorganic material, glass, stone, ceramic raw material, concrete, rigid synthetic material, flexible synthetic material, textile, leather or paper, and most preferably wood, metal, alloy or inorganic material.

The substrate may optionally have a conventional primer before being coated.

The product, which could be manufactured as final good, is preferably furniture.

Aqueous Two-Component Coating Composition

The aqueous hydroxyl resin dispersion is preferably a hydroxyl group-containing polyacrylate dispersion, and most preferably a hydroxyl group-containing polyacrylate dispersion with a weight average molecular weight of 1000-10000.

In principle, all compounds which can be dissolved or dispersed in water and contain groups reactive toward isocyanate are suitable as a reaction partner for the aqueous two-component coating composition of the present invention, such as, polyurethane or polyurea dispersed in water, wherein active hydrogen atoms is present in the urethane or urea groups, and the polyurethane or polyurea can be crosslinked with the water-dispersible modified polyisocyanate.

The aqueous two-component coating composition may optionally contain an auxiliary or additive which is conventional in the coating field, for example, one or more of flow aids, coloring pigments, fillers, defoamers, cosolvents, matting agents and emulsifiers.

The coating formed by drying the aqueous two-component coating composition at room temperature has good performance.

The aqueous two-component coating composition can also be dried at an elevated temperature or at a temperature of up to 260° C.

The aqueous two-component coating composition may be wood coating, textile coating, plastic coating, architectural coating, or metal coating, and most preferably wood coating.

The present invention in particular pertains to the following aspects:

1. A water-dispersible modified polyisocyanate obtainable by the reaction of a system comprising
   a. a water-dispersible polyisocyanate; and
   b. an isocyanate-reactive component;

wherein the water-dispersible modified polyisocyanate comprises structures of formula I, II and III:

I

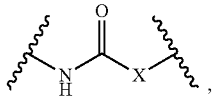

II

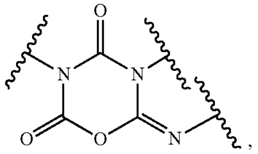

III

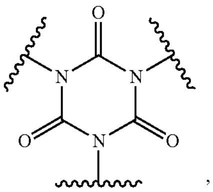

wherein X is selected from O, S, $NR^9$ and $CR^{10}R^{11}$; wherein, $R^9$, $R^{10}$ and $R^{11}$ may be identical or different and represent hydrogen or organic groups inert to isocyanate groups, preferably hydrogen; and the ratio of moles of the carbon atoms in the structure of formula I to the sum of moles of the structures of formula II and III calculated according to carbon NMR spectrum is 0.005-0.24, wherein the term "moles of the carbon atoms in the structure of formula I" refers to the moles of carbon atoms in carbonyl group in formula I; and the viscosity of the water-dispersible modified polyisocyanate is 3000 mPa·s to 11000 mPa·s, which is measured with a MV-DIN rotor in accordance with DIN EN ISO 3219: 1994-10 at 23° C. and at a shear rate of 10 $s^{-1}$.

2. The water-dispersible modified polyisocyanate according to aspect 1, wherein the component a) water-dispersible polyisocyanate has at least one of the following characteristics:
   A. average isocyanate functionality of at least 1.8;
   B. number average molecular weight of 700 g/mol-1000 g/mol;
   C. molecular weight distribution of 1.1-1.6;
   D. viscosity of 500 mPa·s-6000 mPa·s;
   E. isocyanate group content of 4.0% by weight to 26% by weight, relative to the total weight of the water-dispersible polyisocyanate; and
   F. sulfonate group content of 0.1% by weight to 7.7% by weight, relative to the total weight of the water-dispersible polyisocyanate.
3. The water-dispersible modified polyisocyanate according to aspect 1 or 2, wherein the component b) isocyanate-reactive component is one or more of water and compounds having a structure of formula IV:

IV $$(H_a - Y \rightarrow_b R^1,$$

wherein Y is selected from O, N, S and O—CO, and a is an integer greater than or equal to 1, b is an integer greater than or equal to 1, and $R^1$ is an organic group that is inert to isocyanate groups.

4. The water-dispersible modified polyisocyanate according to aspect 3, wherein Y in the compound having the structure of formula IV is an oxygen atom, and a is 1, b is ≥2, preferably 2-6, and most preferably 2-4.
5. The water-dispersible modified polyisocyanate according to aspect 3, wherein the compound having the structure of formula IV is one or more of polyacids with a molecular weight of 40 g/mol-1000 g/mol, polyamines with a molecular weight of 40 g/mol-1000 g/mol, polythiols with a molecular weight of 40 g/mol-1000 g/mol, low-molecular-weight hydroxy alcohols with a molecular weight of and polyhydroxy polymer with a molecular weight of 200 g/mol-5000 g/mol; and most preferably ethylene glycol.
6. The water-dispersible modified polyisocyanate according to any one of aspects 1-5, wherein the water-dispersible modified polyisocyanate has at least one of the following characteristics:
   i. average isocyanate functionality of at least 1.5;
   ii. number average molecular weight of 700 g/mol-1200 g/mol;
   iii. molecular weight distribution of 1.2-2.0;
   iv. isocyanate group content of 4.0% by weight to 23% by weight, relative to the total weight of the water-dispersible modified polyisocyanate;
   v. sulfonate group content of 0.1% by weight to 7.5% by weight, relative to the total weight of the water-dispersible modified polyisocyanate;
   vi. the total amount of molecules with a number average molecular weight greater than 2700 g/mol of 3.0% by weight to 20% by weight, relative to the total weight of the water-dispersible modified polyisocyanate;
   vii. the content of the ethylene oxide units bonded into the polyether chain of the modified polyisocyanate of not more than 19.5% by weight, relative to the total weight of the water-dispersible modified polyisocyanate;
7. The water-dispersible modified polyisocyanate according to any one of aspects 1-6, wherein the ratio of moles of the carbon atoms in the structure of formula I to the sum of moles of the structures of formula II and III calculated according to carbon NMR spectrum is 0.005-0.15.
8. The water-dispersible modified polyisocyanate according to any one of aspects 1-7, wherein the water-dispersible modified polyisocyanate is obtained by the reaction of a system comprising
   a. a water-dispersible polyisocyanate with the characteristics of
   A. average isocyanate functionality of at least 1.8;
   B. number average molecular weight of 700 g/mol-1000 g/mol;
   C. molecular weight distribution of 1.1-1.6;
   D. viscosity of 500 mPa·s-6000 mPa·s;
   E. isocyanate group content of 4.0% by weight to 26% by weight, relative to the total weight of the water-dispersible polyisocyanate; and
   F. sulfonate group content of 0.1% by weight to 7.7% by weight, relative to the total weight of the water-dispersible polyisocyanate; and b. an isocyanate-reactive component, which is one or more of water and low-molecular-weight hydroxy alcohols with a molecular weight of 40 g/mol-1000 g/mol.

9. Method for preparing the water-dispersible modified polyisocyanate according to any one of aspects 1-8, including a step of mixing the component a) water-dispersible polyisocyanate or a component for preparing the water-dispersible polyisocyanate with the component b) isocyanate-reactive component in any manner
10. Use of the water-dispersible modified polyisocyanate according to any one of aspects 1-8 as a starting component for preparing polyurethanes.
11. Use of the water-dispersible modified polyisocyanate according to any one of aspects 1-8 as a crosslinking component in water-soluble or water-dispersible coating compositions, adhesives or sealants.
12. Use of the water-dispersible modified polyisocyanate according to any one of aspects 1-8 as a starting component for preparing polyisocyanates blocked by a blocking agent.
13. A coating composition, an adhesive or a sealant comprising the water-dispersible modified polyisocyanate according to any one of aspects 1-8.
14. A substrate coated with the coating composition, the adhesive or the sealant according to aspect 13.
15. Use of the water-dispersible modified polyisocyanate according to any one of aspects 1-8 for improving the manual stirring behavior of coating compositions, adhesives or sealants.
16. Use of the water-dispersible modified polyisocyanate according to any one of aspects 1-8 as a crosslinking component in water-soluble or water-dispersible aqueous two-component coating compositions.
17. An aqueous two-component coating composition comprising at least an aqueous hydroxy resin dispersion, at least a water-dispersible modified polyisocyanate according to any one of aspects 1-8, optionally an auxiliary agent and optionally an additive.
18. Method for preparing an aqueous two-component coating composition, including steps of mixing an aqueous hydroxy resin dispersion, optionally an auxiliary and optionally an additive in any manner to obtain a mixture, and mixing and manually stirring the water-dispersible modified polyisocyanate according to any one of aspects 1-8 with the mixture to obtain the aqueous two-component coating composition.
19. A product comprising a substrate and a coating formed by applying the aqueous two-component coating composition according to aspect 17 to the substrate.
20. Method for manufacturing a product, including applying the aqueous two-component coating composition according to aspect 17 to a substrate, and then curing and drying.

EXAMPLES

Unless defined otherwise, all technical and scientific terms used herein have the same meaning as commonly understood by those skilled in the art. When the definition of a term in this specification conflicts with the meanings commonly understood by those skilled in the art, the definition described herein shall apply.

Unless indicated otherwise, all numbers expressing quantities of ingredients, reaction conditions and the like used in the specification and claims are to be understood as being modified by the term "about". Accordingly, unless indicated to the contrary, the numerical parameters set forth herein are approximations that can vary depending upon the desired properties to be obtained.

Unless otherwise indicated, the wordings "a", "an", and "the" used herein are intended to include "at least one" or "one or more". For example, the wording "a component" refers to one or more components, therefore more than one component may be considered and may be adopted or used in the implementation of the described embodiments.

The wording "and/or" used herein refers to one or all of the cited elements.

The wordings "include" and "comprise" used herein cover the presence of the mentioned elements alone and the presence of other elements which are not mentioned in addition to the mentioned elements.

All percentages in the present invention are weight percentage, unless otherwise stated.

The analysis and measurement in the present invention are performed at 23° C., unless otherwise stated.

The viscosity is measured with a MV-DIN rotor at 23° C. and at a shear rate of 10 $s^{-1}$ according to DIN EN ISO 3219: 1994-10.

The isocyanate group (NCO) content is determined according to DIN-EN ISO 11909:2007-05.

Test standard for color value: DIN-EN1557: 1997-03.

Test standard for gloss: GB/T 9754-2007.

Test standard for haze: ASTM E430-11.

Raw Materials and Agents

Tetrabutylphosphonium fluoride solution: from Jinjinle Chemical Company.

Di-n-butyl phosphate: available from Sigma-Aldrich Shanghai Trading Co., Ltd.

Aquolin 268: solid content of 100% by weight, isocyanate group content of 20.5% by weight, and viscosity of 3500-5500 mPa·s, from Wanhua Chemical.

Aquolin 270: solid content of 100% by weight, isocyanate group content of 20.5% by weight, and viscosity of 3500-5500 mPa·s, from Wanhua Chemical.

Ethylene glycol: available from Sigma-Aldrich Shanghai Trading Co., Ltd.

Pripol 2030: polyester polyol with a molecular weight of 570 g/mol, functionality of 2, and hydroxyl value of 197 mg KOH/g, from Croda Industrial Chemicals.

Desmophen LP 112: polypropylene glycol with a molecular weight of 1000 g/mol, and hydroxyl value of 112 mg KOH/g, from Covestro AG.

PTHF 1000: polytetrahydrofuran with a molecular weight of 1000 g/mol, and hydroxyl value of 112 mg KOH/g, from Covestro AG.

Bis(2-mercaptoethyl) sulfide: available from Sigma-Aldrich Shanghai Trading Co., Ltd.

PEG 300: polyethylene glycol monomethyl ether with a molecular weight of 300 g/mol, and hydroxyl value of 187 mg KOH/g, from Sigma-Aldrich Shanghai Trading Co., Ltd.

TMP: 1,1,1-trimethylolpropane, molecular weight of 134.17 g/mol, available from Sigma-Aldrich Shanghai Trading Co., Ltd.

Desmophen L 400: polypropylene glycol with a molecular weight of 561 g/mol, and hydroxyl value of 200 mg KOH/g, from Covestro AG.

3-aminopropyltrimethoxysilane: available from Sigma-Aldrich Shanghai Trading Co., Ltd.

Diethyl maleate: available from Sigma-Aldrich Shanghai Trading Co., Ltd.

Siloxane-containing secondary amine 62.5 g of 3-aminopropyltrimethoxysilane were charged into a 250 mL four-necked flask under nitrogen atmosphere at room temperature. Subsequently, 60.0 g of diethyl maleate were added dropwise over 50 minutes under stirring. The reaction was carried out at room temperature for 4 hours to obtain a colorless and clear solution.

Bayhydrol A 2470: aqueous hydroxyacrylate dispersion, from Covestro, Germany.

BUTYL CELLOSOLVE: Cosolvent, ethylene glycol butyl ether, from Dow Chemical, USA.

RHEOVIS PU 1291: hydrophobically modified ethoxylated polyurethane, rheological additive, associative thickener, from BASF, Germany BYK 028: silicone defoamer (a mixture of foam-breaking polysiloxane and hydrophobic particles in polyethylene glycol), from BYK, Germany.

BYK 346: wetting and leveling agent (polyether modified siloxane solution), from BYK, Germany Preparation of Starting Polyisocyanates Starting polyisocyanate 1: A four-necked flask equipped with a stirrer, a thermometer, a reflux cooling tube, a nitrogen inlet pipe and a dropping funnel was set under nitrogen atmosphere. 850 g of hexamethylene diisocyanate (HDI) were added, and it was heated to 65° C. with stirring. Then 5.5 g of a catalyst trimethyl-2-methyl-2-hydroxyethylammonium hydroxide (solution diluted to 5% by weight with isobutanol) were added. Upon the NCO of the reaction solution being 39% by weight, 1.1 g of di-n-butyl phosphate was added to terminate the reaction. The unreacted monomers were removed by means of a thin film evaporator at 140° C. and under a vacuum of 0.05 mbar to obtain the starting polyisocyanate 1 with 100% by weight of non-volatile ingredients, viscosity of 3000 mPa·s (23.5° C.), NCO content of 21.7% by weight, HDI monomer concentration of 0.25% by weight.

Starting polyisocyanate 2: By using the method for preparing the starting polyisocyanate 1, the reaction was terminated upon the NCO content of the reaction solution being of 32%. The unreacted monomers were removed by means of a thin film evaporator at 140° C. and under a vacuum of 0.5 mbar to obtain the starting polyisocyanate 2 with 100% by weight of non-volatile ingredients, viscosity of 16000 mPa·s (23.5° C.), NCO content of 20% by weight, HDI monomer concentration of by weight.

Starting polyisocyanate 3: By using the method for preparing the starting polyisocyanate 1 and using tetrabutylphosphonium fluoride solution (diluted to 50% with a mixture of isopropanol/methanol in a weight ratio of 2:1) as a catalyst, di-n-butyl phosphate was added to terminate the reaction, upon the NCO content of the reaction solution reaching 43%. The unreacted monomers were removed by means of a thin film evaporator at 140° C. and under a vacuum of 0.5 mbar to obtain the starting polyisocyanate 3 with 100% by weight of non-volatile ingredients, viscosity of 700 mPa·s (23.5° C.), NCO content of 23.4% by weight, HDI monomer concentration of 0.25% by weight.

Preparation of Water-Dispersible Polyisocyanates

Water-dispersible polyisocyanate 1: 428.7 g (2.20 eq) of the starting polyisocyanate 1, 285.12 g (1.58 eq) of the starting polyisocyanate 3, 20.32 g (0.09 eq) of 3-cyclohexylaminopropanesulfonic acid and 11.7 g (0.09 mol) of dimethylcyclohexylamine were stirred at 80° C. for 4 hours under dry nitrogen atmosphere. After cooling to room temperature, the water-dispersible polyisocyanate 1 with the following characteristic data was obtained:

Average isocyanate functionality: 3.2
Number average molecular weight: 771 g/mol
Molecular weight distribution: 1.23
Solid content: 100% by weight
NCO content: 20.9% by weight
Viscosity (23° C.): 3501 mPa·s
Color value (Hazen): 16
Sulfonate group content: 0.98% by weight
Ethylene oxide group content: 0.0% by weight.

Water-dispersible polyisocyanate 2: 38.04 g (0.1792 eq) of the starting polyisocyanate 2, 342.00 g (1.9217 eq) of the starting polyisocyanate 3, 12.00 g (0.05 eq) of 3-cyclohexylaminopropanesulfonic acid and 7.0 g (0.06 mol) of dimethylcyclohexylamine were stirred at 80° C. for 4 hours under dry nitrogen atmosphere. After cooling to room temperature, the water-dispersible polyisocyanate 2 with the following characteristic data was obtained:

Average isocyanate functionality: 3.2
Number average molecular weight: 738 g/mol
Molecular weight distribution: 1.19
Solid content: 100% by weight
NCO content: 21.43% by weight
Viscosity (23° C.): 2137 mPa·s
Color value (Hazen): 16
Sulfonate group content: 0.98% by weight
Ethylene oxide group content: 0.0% by weight.

Table 1 shows the raw materials for preparing the water-dispersible modified polyisocyanates and the characteristic data of the water-dispersible modified polyisocyanates. Table 2 shows the formulas of component A of the aqueous two-component coating compositions. Table 3 shows the formulas and test results of the aqueous two-component coating compositions of Examples and Comparative Examples.

Preparation of Water-Dispersible Modified Polyisocyanates

According to table 1, the water-dispersible polyisocyanate and the isocyanate-reactive component were charged into a four-necked flask under nitrogen atmosphere, stirred and heated to 80° C. After the NCO % of the reaction solution reached a theoretical value, it was cooled down to obtain a clear solution of the water-dispersible modified polyisocyanate.

TABLE 1

Raw materials and characteristic data of water-dispersible modified polyisocyanates

| Water-dispersible modified poly-isocyanate | Water-dispersible polyisocyanate: Component | Water-dispersible polyisocyanate: Content % | Isocyanate-reactive component: Component | Isocyanate-reactive component: Content % | Characteristic data of water-dispersible modified polyisocyanates: Content of isocyanate groups/% | Viscosity/ mPa · s | Number average molecular weight: (g/mol) | Molecular weight distribution | Total amount of molecules with a molecular weight greater than 2700 g/mol | p |
|---|---|---|---|---|---|---|---|---|---|---|
| 1 | water-dispersible polyisocyanate 1 | 99.87 | ethylene glycol | 0.13 | 20.96 | 3604 | 778 | 1.26 | 3.4 | 0.01 |
| 2 | water-dispersible polyisocyanate 2 | 99.86 | ethylene glycol | 0.14 | 21.12 | 3029 | 795 | 1.35 | 5.58 | 0.01 |
| 3 | water-dispersible polyisocyanate 1 | 99.6 | ethylene glycol | 0.4 | 20.41 | 5157 | 853 | 1.34 | 6.19 | 0.04 |
| 4 | Aquolin 270 | 99.6 | ethylene glycol | 0.4 | 20.82 | 5114 | 820 | 1.27 | 4 | 0.04 |
| 5 | water-dispersible polyisocyanate 1 | 99.3 | ethylene glycol | 0.7 | 20.0 | 6784 | 872 | 1.37 | 7.23 | 0.08 |
| 6 | water-dispersible polyisocyanate 1 | 99.0 | ethylene glycol | 1.0 | 19.37 | 10650 | 931 | 1.52 | 12.28 | 0.11 |
| 7 | water-dispersible polyisocyanate 1 | 99.3 | ethylene glycol | 0.07 | 20.95 | 3470 | 810 | 1.27 | 4 | 0.00 |
| 8 | water-dispersible polyisocyanate 1 | 97.68 | Pripol 2030 | 2.32 | 20.39 | 5005 | 813 | 1.47 | 6.76 | 0.00 |
| 9 | water-dispersible polyisocyanate 1 | 99.23 | siloxane-containing secondary amine | 0.77 | 20.83 | 3615 | 795 | 1.25 | 3.63 | 0.01 |
| 10 | water-dispersible polyisocyanate 1 | 97.84 | Desmophen LP 112 | 2.16 | 20.53 | 3614 | 843 | 1.36 | 7.2 | 0.01 |
| 11 | water-dispersible polyisocyanate 1 | 97.84 | PTHF 1000 | 2.16 | 20.53 | 3891 | 840 | 1.44 | 8.0 | 0.01 |
| 12 | water-dispersible polyisocyanate 1 | 99.66 | bis (2-mercaptoethyl) sulfide) | 0.34 | 20.8 | 4058 | 828 | 1.3 | 5.23 | 0.01 |
| 13 | water-dispersible polyisocyanate 1 | 99.34 | PEG 300 | 0.66 | 20.75 | 3780 | 824 | 1.32 | 5.22 | 0.01 |
| 14 | water-dispersible polyisocyanate 1 | 99.79 | TMP | 0.21 | 20.83 | 3914 | 797 | 1.28 | 4.3 | 0.01 |
| 15 | water-dispersible polyisocyanate 1 | 97.84 | Desmophen L400 | 2.16 | 20.35 | 4388 | 836 | 1.35 | 6.55 | 0.02 |
| 16 | water-dispersible polyisocyanate 1 | 99.96 | water | 0.04 | 20.75 | 4086 | 805 | 1.25 | 3.28 | 0.00 |
| 17 | water-dispersible polyisocyanate 1 | 99.9 | water | 0.1 | 20.46 | 5225 | 822 | 1.28 | 4.29 | 0.01 |
| 18 | water-dispersible polyisocyanate 1 | 99.9 | ethylene glycol | 0.01 | 21.02 | 3372 | 813 | 1.23 | 2.84 | 0.00 |

TABLE 1-continued

Raw materials and characteristic data of water-dispersible modified polyisocyanates

| Water-dispersible modified poly-isocyanate | Water-dispersible polyisocyanate: Component | Water-dispersible polyisocyanate: Content % | Isocyanate-reactive component: Component | Isocyanate-reactive component: Content % | Characteristic data of water-dispersible modified polyisocyanates: Content of isocyanate groups/% | Viscosity/ mPa · s | Number average molecular weight: (g/mol) | Molecular weight distribution | Total amount of molecules with a molecular weight greater than 2700 g/mol | p |
|---|---|---|---|---|---|---|---|---|---|---|
| 19 | water-dispersible polyisocyanate 1 | 98.0 | ethylene glycol | 2.0 | 17.82 | 37990 | 1055 | 1.66 | 18.03 | 0.23 |
| 20 | Aquolin 268 | 99.86 | ethylene glycol | 0.14 | 19.82 | 11650 | 905 | 1.39 | 8.05 | 0.01 |

Notes:
1. p is the ratio of moles of the carbon atoms in the structure of formula I to the sum of moles of the structures of formula II and III calculated according to carbon NMR spectrum; Calculation of p: $p = I_c/(II_c/3 + III_c/3)$, wherein Ic is the integrated area of the peaks of the carbon atoms in the formula I in the carbon NMR spectrum, IIc is the integrated area of the peaks of the three carbon atoms in the ring represented by the formula II in the carbon NMR spectrum, and IIIc is the integrated area of the peaks of the three carbon atoms in the ring represented by the formula III in the carbon NMR spectrum.
2. The content of the water-dispersible polyisocyanate refers to the percentage of the weight of the water-dispersible polyisocyanate in the total weight of the system. The content of the isocyanate-reactive component refers to the percentage of the weight of the isocyanate-reactive component in the total weight of the system. In table 1, the system comprises the water-dispersible polyisocyanate and the isocyanate-reactive component.
3. Molecular weight distribution refers to the ratio of the weight average molecular weight to the number average molecular weight of components.
4. The total amount of molecules with a molecular weight greater than 2700 g/mol is calculated relative to the total weight of the water-dispersible modified polyisocyanate.

Method for Preparing the Aqueous Two-Component Coating Compositions of the Examples and Comparative Examples Formulation of Component A:

According to the formula listed in Table 2, a defoamer, a leveling agent, a cosolvent, a rheological additive and water were added in sequence into the aqueous hydroxyacrylate dispersion, and dispersed at 1500 rpm for 20 minutes to obtain component A.

TABLE 2

Formula of component A

| Formula | Weight/g |
|---|---|
| Bayhydrol A2470 | 70 |
| BYK 028 | 0.5 |
| BYK 346 | 0.5 |
| BUTYL CELLOSOLVE | 2 |
| RHEOVIS PU 1291 | 1 |
| Deionized water | 26 |
| Total weight | 100 |

The water-dispersible modified polyisocyanate of the present invention or the comparative modified polyisocyanate was used as component B. 50 g of component A and component B (molar ratio of the isocyanate groups to the hydroxyl groups of 1.5:1) were mixed, and manually stirred with a wood stick for 30 seconds to obtain the aqueous two-component coating compositions of the Examples and the Comparative Examples.

Test Method for Water Dispersibility 7.5 g of water were added to the aqueous two-component coating composition. The mixture was stirred manually, and filtered with a 100 mesh filter, and visually observed for the residue on the filter. Less residue on the filter indicated a better dispersibility of the modified polyisocyanate in the resin system. According to the amount of the residue on the filter, the dispersibility of the modified polyisocyanate in the resin system was rated as 1-3, wherein score 1 means a large amount of residue on the filter; score 2 means a detectable amount of residue on the filter; and score 3 means almost no residue on the filter. Thus, score 1 means the worst, and score 3 means the best.

Test Conditions for Gloss and Haze 7.5 g of water were added to the aqueous two-component coating composition. The mixture was stirred manually, and filtered with a 100 mesh filter. The filtered coating composition was applied onto a black plastic board with a wet film thickness of 120 microns. The appearance of the wet film was observed and recorded in table 3. A coating was obtained after drying in the air, and the gloss and haze data thereof were tested and recorded in table 3.

Criteria for Evaluating the Gloss and the Haze

Gloss 60°≥80, haze value <100, wherein a greater value of gloss 60° indicated higher gloss of the coating, and a greater haze value indicated worse transparency of the coating.

TABLE 3

Formulas and test results of aqueous two-component coating compositions

| | Component B of coating compositions | Test results of coating compositions or coatings: Dispersibility | Appearance of wet films | Appearance of dry films | Gloss 60° | Haze |
|---|---|---|---|---|---|---|
| Examples 1 | Water-dispersible modified polyisocyanate 1 | score 3 | normal | high gloss, good transparency | 90.8 | 42.1 |

TABLE 3-continued

| Formulas and test results of aqueous two-component coating compositions | | | | | | |
|---|---|---|---|---|---|---|
| | | Test results of coating compositions or coatings | | | | |
| | Component B of coating compositions | Dispersibility | Appearance of wet films | Appearance of dry films | Gloss 60° | Haze |
| Examples 2 | water-dispersible modified polyisocyanate 2 | score 3 | normal | high gloss, good transparency | 90.5 | 44.5 |
| Examples 3 | water-dispersible modified polyisocyanate 3 | score 3 | normal | high gloss, good transparency | 90.5 | 46.3 |
| Examples 4 | water-dispersible modified polyisocyanate 4 | score 3 | normal | high gloss, good transparency | 90.5 | 42.5 |
| Examples 5 | water-dispersible modified polyisocyanate 5 | score 3 | normal | high gloss, good transparency | 90.5 | 46.2 |
| Examples 6 | water-dispersible modified polyisocyanate 6 | score 3 | normal | high gloss, good transparency | 89.4 | 51.5 |
| Examples 7 | water-dispersible modified polyisocyanate 7 | Score 3 | Normal | High gloss, good transparency | 90.9 | 44 |
| Examples 8 | water-dispersible modified polyisocyanate 8 | score 3 | normal | high gloss, good transparency | 90.4 | 44.1 |
| Examples 9 | water-dispersible modified polyisocyanate 9 | score 3 | normal | high gloss, good transparency | 90.3 | 46.4 |
| Examples 10 | water-dispersible modified polyisocyanate 10 | score 3 | normal | High gloss, good transparency | 91 | 44.5 |
| Examples 11 | water-dispersible modified polyisocyanate 11 | score 3 | normal | High gloss, good transparency | 90.6 | 43.3 |
| Examples 12 | water-dispersible modified polyisocyanate 12 | score 3 | normal | high gloss, good transparency | 90.5 | 40.6 |
| Examples 13 | water-dispersible modified polyisocyanate 13 | score 3 | normal | high gloss, good transparency | 90.9 | 44.7 |
| Examples 14 | water-dispersible modified polyisocyanate 14 | score 3 | normal | high gloss, good transparency | 90.5 | 43.4 |
| Examples 15 | water-dispersible modified polyisocyanate 15 | score 3 | normal | high gloss, good transparency | 90.9 | 43.7 |
| Examples 16 | water-dispersible modified polyisocyanate 16 | score 3 | normal | high gloss, good transparency | 91.7 | 39.9 |
| Examples 17 | water-dispersible modified polyisocyanate 17 | score 3 | normal | high gloss, good transparency | 91.4 | 40.1 |
| Comparative Example 1 | water-dispersible modified polyisocyanate 18 | score 2 | normal | high gloss, good transparency | 90.4 | 55 |
| Comparative Example 2 | water-dispersible modified polyisocyanate 19 | score 3 | whitish | low gloss, poor transparency | 47.9 | >400 |
| Comparative Example 3 | water-dispersible modified polyisocyanate 20 | score 1 | normal | high gloss, good transparency | 90.9 | 44 |

The aqueous two-component coating compositions of Examples 1-17 had good dispersibility, and the formed coatings had high gloss and good transparency. The aqueous two-component coating compositions of Comparative Example 1 and 3 had poor dispersibility, that is, poor manual stirring behavior, and the coating formed by the aqueous two-component coating composition of Comparative Example 2 had low gloss and poor transparency.

Those skilled in the art will readily understand that the present invention is not limited to the foregoing details, and can be implemented in other specific forms without departing from the spirit or main characteristics of the present invention. Therefore, the examples should be regarded as illustrative rather than restrictive from any point of view, so that the scope of the present invention is illustrated by the claims rather than the foregoing description. Therefore any change shall be regarded as belonging to the present invention, as long as it falls into the meaning and scope of equivalents of the claims.

The invention claimed is:

1. A water-dispersible modified polyisocyanate comprising a reaction product of a system comprising a. a water-dispersible polyisocyanate; and b. an isocyanate-reactive component;

wherein the water-dispersible modified polyisocyanate comprises structures of formula I, II and III:

I

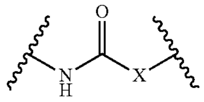

,

II

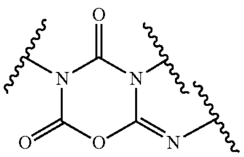

,

III

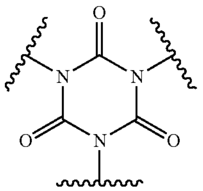

, wherein X is selected from O, S, $NR^9$ and $CR^{10}R^{11}$; wherein $R^9$, $R^{10}$ and $R^{11}$ may be identical or different and represent hydrogen or organic groups inert to isocyanate groups; and the ratio of moles of the carbon atoms in the carbonyl group of formula I to the sum of moles of the structures of formula II and III calculated according to carbon NMR spectrum is 0.005-0.24; and the viscosity of the water-dispersible modified polyisocyanate is 3000 mPa·s to 11000 mPa·s, measured with a MV-DIN rotor in accordance with DIN EN ISO 3219:1994-10 at 23° C. and at a shear rate of 10 $s^{-1}$, wherein the component b) isocyanate-reactive component is one or more of water and compounds having a structure of formula IV:

IV $$(H_a-Y)_b-R^1,$$

wherein Y is selected from O, N, S and O—CO, a is an integer greater than or equal to 1, b is an integer greater than or equal to 2, and $R^1$ is an organic group that is inert to isocyanate groups, and wherein the compound having a structure of formula IV is one or more of polyacids with a molecular weight of 90 g/mol-1000 g/mol, polyamines with a molecular weight of 40 g/mol-1000 g/mol, polythiols with a molecular weight of 40 g/mol-1000 g/mol and low-molecular-weight hydroxy alcohols with a molecular weight of 40 g/mol-1000 g/mol, wherein the low-molecular-weight hydroxy alcohols are one or more of ethylene glycol, propylene glycol, butylene glycol, pentanediol, hexanediol, heptanediol, octanediol, nonanediol, 1,10-decanediol, isomeric pentanediols, 1,2-cyclohexanediol, 1,4-cyclohexanediol, 1,4-cyclohexylcyclohexanol, 4,4'-(1-methylethylene)dicyclohexanol, 1,1,1-trimethylolethane, 1,2,6-hexanetriol, 1,1,1-trimethylolpropane, 2,2-bis(hydroxymethyl)-1,3-propanediol, 1,2,4-trihydroxycyclohexane, 1,3,5-trihydroxycyclohexane, 1,3,5-tris(2-hydroxyethyl) isocyanurate and neopentyl glycolhydroxypivalate.

2. The water-dispersible modified polyisocyanate according to claim 1, wherein the component a) water-dispersible polyisocyanate has:

A. an average isocyanate functionality of at least 1.8;

B. a number average molecular weight of 700 g/mol-1000 g/mol;

C. a molecular weight distribution of 1.1-1.6;

D. a viscosity of 500 mPa·s-6000 mPa·s;

E. an isocyanate group content of 4.0% by weight to 26% by weight, relative to the total weight of the water-dispersible polyisocyanate;

F. a sulfonate group content of 0.1% by weight to 7.7% by weight, relative to the total weight of the water-dispersible polyisocyanate; or G. a combination of any two or more of A to F.

3. The water-dispersible modified polyisocyanate according to claim 1, wherein Y in the compound having the structure of formula IV is an oxygen atom, a is 1, and b is ≥2.

4. The water-dispersible modified polyisocyanate according to claim 1, wherein the water-dispersible modified polyisocyanate has:

i. an average isocyanate functionality of at least 1.5;

ii. a number average molecular weight of 700 g/mol-1200 g/mol;

iii. a molecular weight distribution of 1.2-2.0;

iv. an isocyanate group content of 4.0% by weight to 23% by weight, relative to the total weight of the water-dispersible modified polyisocyanate;

v. a sulfonate group content of 0.1% by weight to 7.5% by weight, relative to the total weight of the water-dispersible modified polyisocyanate;

vi. a total amount of molecules with a number average molecular weight greater than 2700 g/mol of 3.0% by weight to 20% by weight, relative to the total weight of the water-dispersible modified polyisocyanate;

vii. a content of ethylene oxide units bonded into a polyether chain of the modified polyisocyanate of not more than 19.5% by weight, relative to the total weight of the water-dispersible modified polyisocyanate; or viii. a combination of any two or more of i to vii.

5. The water-dispersible modified polyisocyanate according to claim 1, wherein the ratio of moles of the carbon atoms in the carbonyl group of formula I to the sum of moles of the structures of formula II and III calculated according to carbon NMR spectrum is 0.005-0.15.

6. The water-dispersible modified polyisocyanate according to claim 1, wherein:

a. the water-dispersible polyisocyanate has

A. an average isocyanate functionality of at least 1.8;

B. a number average molecular weight of 700 g/mol-1000 g/mol;

C. a molecular weight distribution of 1.1-1.6;

D. a viscosity of 500 mPa·s-6000 mPa·s;

E. an isocyanate group content of 4.0% by weight to 26% by weight, relative to the total weight of the water-dispersible polyisocyanate; and F. a sulfonate group content of 0.1% by weight to 7.7% by weight, relative to the total weight of the water-dispersible polyisocyanate; and b. the isocyanate-reactive component comprises one or more of water and a hydroxy alcohol with a molecular weight of 40 g/mol-1000 g/mol.

7. A method for preparing the water-dispersible modified polyisocyanate according to claim 1, comprising mixing the component a) water-dispersible polyisocyanate or a component for preparing the water-dispersible polyisocyanate with the component b) isocyanate-reactive component in any manner.

8. A coating composition, an adhesive or a sealant comprising the water-dispersible modified polyisocyanate according to claim 1.

9. A substrate coated with the coating composition, the adhesive or the sealant according to claim 8.

10. A method for preparing an aqueous two-component coating composition, comprising mixing an aqueous hydroxy resin dispersion, optionally an auxiliary and optionally an additive in any manner to obtain a mixture, and mixing and manually stirring the water-dispersible modified polyisocyanate according to claim 1 with the mixture to obtain the aqueous two-component coating composition.

11. A product comprising a substrate and a coating formed by applying an aqueous two-component coating composition comprising an aqueous hydroxy resin dispersion, the water-dispersible modified polyisocyanate according to claim 1, optionally an auxiliary agent and optionally an additive to the substrate.

12. A polyisocyanate blocked by a blocking agent and prepared from the water-dispersible modified polyisocyanate according to claim 1.

13. A polyurethane prepared from the water-dispersible modified polyisocyanate according to claim 1.

14. A crosslinking component in a water-soluble or water-dispersible coating composition, adhesive or sealant or a crosslinking component in a water-soluble or water-dispersible aqueous two-component coating composition that is prepared from the water-dispersible modified polyisocyanate according to claim 1.

15. The water-dispersible modified polyisocyanate according to claim 1, wherein the compound having the structure of formula IV does not contain any polyhydroxy polymer.

16. The water-dispersible modified polyisocyanate according to claim 1, wherein the compound having the structure of formula IV is selected from the group consisting of: one or more of polyacids with a molecular weight of 90 g/mol-1000 g/mol, polyamines with a molecular weight of 40 g/mol-1000 g/mol, and polythiols with a molecular weight of 40 g/mol-1000 g/mol.

* * * * *